United States Patent [19]
Westland

[11] Patent Number: 5,251,596
[45] Date of Patent: Oct. 12, 1993

[54] TWO STROKE ROTARY INTERNAL COMBUSTION ENGINE

[76] Inventor: Martin W. Westland, 8379 S. 19th, Bozeman, Mont. 59715

[21] Appl. No.: 636,101

[22] Filed: Dec. 31, 1990

[51] Int. Cl.⁵ ............................................. F02B 53/00
[52] U.S. Cl. ..................................... 123/242; 418/61.2
[58] Field of Search ........................... 123/65 BA, 242; 418/164, 61.2

[56] References Cited

U.S. PATENT DOCUMENTS

| | | | |
|---|---|---|---|
| 2,988,008 | 6/1961 | Wankel | 123/242 |
| 2,988,065 | 6/1961 | Wankel | 123/242 |
| 3,051,148 | 8/1962 | Warner | 123/65 BA |
| 3,314,401 | 4/1967 | Kell | 123/242 |
| 3,967,594 | 7/1976 | Campbell | 123/242 |

FOREIGN PATENT DOCUMENTS

| | | | |
|---|---|---|---|
| 164947 | 12/1949 | Austria | 123/242 |
| 1300123 | 7/1969 | Fed. Rep. of Germany | 123/242 |
| 640621 | 6/1962 | Italy | 123/242 |
| 964083 | 7/1964 | United Kingdom | 123/242 |

Primary Examiner—Michael Koczo

[57] ABSTRACT

A two-stroke cycle rotary internal combustion engine of the Wankel type is disclosed. The engine provides a flow through intake and exhaust with intake ports on one side wall of an epitrochoidal housing and exhaust ports on the opposite side wall. Compressed air is ducted to an intake plenum which provides a source of intake air as well as bypass air which is routed around the engine for engine cooling. A particular intake and exhaust manifolding and port positioning provides centrifugal pumping for charging and scavenging. Both rotating and stationary housing engines are disclosed and a rotating housing engine having fuel charge stratification and centrifugal filtering of inlet air is also disclosed.

12 Claims, 2 Drawing Sheets

TWO STROKE ROTARY INTERNAL COMBUSTION ENGINE

BACKGROUND OF THE INVENTION

1. Field of the Invention

This invention relates to a two stroke cycle rotary internal combustion engine, and in particular to a two stroke cycle rotary engine of the Wankel type.

2. Discussion of the Technical Problems

Wankel type rotary internal combustion engines have "pistons" rotating within an epitrochoidal housing so that the tips of the rotating body, or piston, maintain contact with the housing and produce an ever changing shaped combustion chamber. Engines of this type have been invented since at least 1961. Engines of this type are known as Wankel Rotary Engines and it is generally accepted that such engines were invented by Felix Wankel. In fact, Felix Wankel described the geometry for such engines in U.S. Pat. No. 2,988,008 issued Jun. 13, 1961.

The Wankel engine provides spaces between the inner rotor and the outer housing or epitrochoid that define variable volumes which are used as compressor chambers. Such rotary engines have been adopted by a number of manufacturers and generally follow the geometric configuration as defined in the Wankel patent. The Wankel engine in widest use employs a three-faced rotating body or "rotor" having three tip seals. The rotor revolves about an eccentric with appropriate phasing gears so that the three tip seals move about the epitrochoid to create cavities of varying volume as the rotor rotates.

Felix Wankel further defined the rotary internal combustion engine in his co-issued U.S. Pat. No. 2,988,065 dated Jun. 13, 1961. The engine that is disclosed in that patent along with subsequent developments have shown that the rotor must complete the equivalent of a four stroke cycle in order to properly produce power. By having the spark plug mounted on one side of the epitrochoid housing defining the compression and power cycles, the opposite chamber can be utilized for exhaust and intake cycles. Multiple rotor engines were thereupon designed to take advantage of that basic four stroke cycle configuration.

Unfortunately in the standard four stroke cycle rotary internal combustion engine of the Wankel type, the area near the spark plug becomes quite heated, whereas the opposite side of the engine near the intake region is relatively cold. Accordingly, the standard Wankel type engine exhibits a heat imbalance. One way of appropriately cooling the heated portion of the engine is to design the external housing to have sufficient cooling fins and the like to offset the uneven cooling that is produced in the normal four stroke Wankel engine.

While prior art rotary internal combustion engines of the Wankel type are generally of the type having a fixed epitrochoidal cavity or housing with one or more rotating pistons known as rotors, it has been disclosed by Wankel and others that the rotor/crankshaft could be held stationary and the epitrochoidal housing could be rotated. While such an arrangement appears to be fine in theory, such engines have been somewhat difficult to design. Accordingly, one finds that the common rotary engine is of the type having a stationary housing.

If on the other hand, one were to rotate either the crankshaft or the housing and have the housing or the crankshaft operably attached to a compressor, a source of compressed air could be produced. Such compressed air could be introduced into the engine and serve as an intake charging means. The raised air pressure would also serve to force the exhaust gases out of the chamber if the intake and exhaust ports were properly designed. Additionally, such a source of compressed air, while providing a source of pressure in order to maintain the proper flow of gases in a two stroke cycle engine, could also provide some cooling bypass air if properly ducted.

The instant invention thus provides a two stroke Wankel type rotary engine having a source of compressed air. If a compressor were to be driven externally of the engine to provide the necessary pressure to operate the two stroke Wankel engine, then even the type of engine having a stationary epitrochoidal housing and moving crankshaft could be employed.

While few known examples of two stroke rotary engines have been discovered, U.S. Pat. No. 2,988,008 to Felix Wankel issued Jun. 13, 1961, and U.S. Pat. No. 2,988,065, also to Felix Wankel, issued Jun. 13, 1961, disclose the basic Wankel engine.

German patent No. 1,300,123 to Horst Mai issued Jul. 31, 1969 discloses a two stroke Wankel engine with poppet valves and intake and exhaust ports on the same side wall of the housing. Unfortunately, the Mai invention necessarily requires the poppet valves since the porting arrangement would not otherwise allow for sufficient scavenging and the Mai seal arrangement requires that the intake and exhaust ports are on the same side wall of the housing.

U.S. Pat. No. 3,967,594 to Campbell issued Jul. 6, 1976 discloses a particular three lobe, compression ignition (Diesel) engine with an elliptical piston and unique gearing and eccentric means supporting the piston within the casing. Unfortunately, the Campbell invention requires that the intake ports are spaced farther from the center of the casing than the exhaust ports and the Campbell invention necessitates that compression ignition and a stationary housing be used.

Very few devices in the known art relate to two stroke rotary engines and none known are directed to two stroke Wankel type rotary internal combustion engines with intake ports on one side wall and exhaust ports on the other side wall of the housing. Also no known devices relate to such engines providing a source of compressed air which is used as scavenging intake air as well as for cooling bypass air.

The instant invention is directed to all of these needs as well as to others as explained in the following summary.

SUMMARY OF THE INVENTION

It is a feature of the invention to provide a two stroke rotary engine.

It is another feature of the instant invention to provide a two stroke Wankel rotary engine with stationary crank shaft.

It is another feature of the invention to provide a specific two stroke cycle port location for both intake and exhaust.

It is another feature of the invention to provide intake and exhaust manifold routing using centrifugal pumping for both intake charging and exhaust scavenging.

It is another feature of the invention to provide a rotating housing to obtain stratification of the fuel charge.

It is another feature of the invention to provide a rotating housing with bypass ducts to filter the inlet air.

It is another feature of the invention to provide bypass air for engine cooling.

These and other features and objects are attained according to the instant invention by providing a two stroke cycle Wankel rotary engine using a single rotor whose side flanks open and close ports in the housing side walls to admit intake charge and allow exhaust to exit. The ports lie in an envelope on the side wall which is exposed only when a rotor face is near the bottom dead center region. The intake ports are fed from an intake manifold connected to an intake plenum which is provided with compressed air from an engine driven air compressor. Cooling air is bled from the intake plenum and ducted around the engine. Exhaust ports lead directly to the atmosphere.

The engine inlet side is fitted with a plenum to gather a quantity of air from a compressor and direct in to the center of rotation. From this plenum extends a series of bypass ducts through which a portion of compressed air escapes. Since the entire plenum is rotating, it would induce rotation of the intake air and thus centrifugally separate denser material and discharge it through the bypass ducts. This air is used for rotor housing cooling. The remaining air is forced to a point near the axis and then allowed to enter the intake manifold. These passages extend outwardly from the axis toward the intake ports. The rotation of these passages further compresses the air. Fuel can be added at this point, or any point downstream of the bypass ducts. The rotation will concentrate the fuel at the outside of the passages and ultimately at the outside of the rotor chamber, thus creating a stratified charge which can be utilized to minimize fuel loss into the exhaust ports during the charging and exhaust portion of the stroke. The exhaust ports are ducted outwardly, and the rotation lowers the pressure at the exhaust ports.

BRIEF DESCRIPTION OF THE DRAWINGS

The advantages of this invention will become apparent upon consideration of the following detailed disclosure of the invention, especially when taken in conjunction with the accompanying drawings, wherein.

DESCRIPTION OF THE PREFERRED EMBODIMENT

Figure 1:
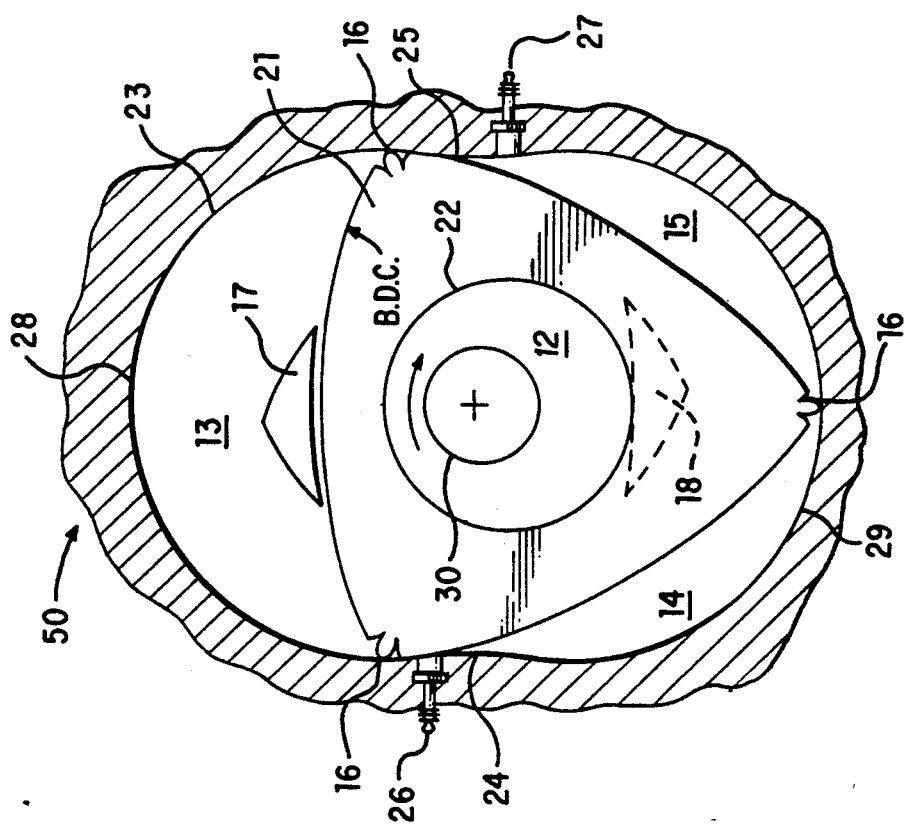
FIG. 1 is an end view of the housing section of a single rotor internal combustion engine with a rotor depicted in place with the top rotor face in a bottom dead center position in accordance with the present invention.

With reference to FIG. 1, it can be seen that an epitrochoidal housing 50 is shown in which a rotor 12 is mounted on an eccentric (not shown) so that the rotation of the rotor 12 creates variable volume cavities 13, 14 and 15. Tip seals 16 are provided at the tips of rotor 12 to seal the rotor tips against the interior of housing 50 to create gas tight seals for the variable volumes created as rotor 12 rotates.

Figure 3:
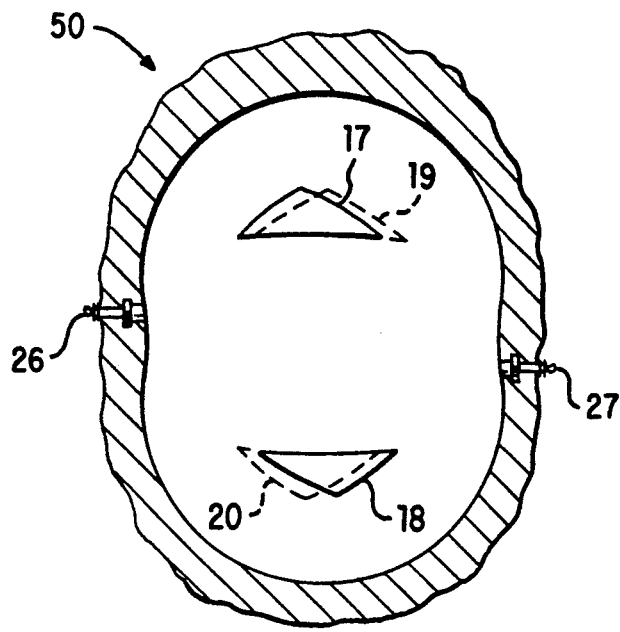
FIG. 3 is an end view of the housing section of a single rotor internal combustion engine without the rotor in place depicting a pair of exhaust ports and a pair of intake ports in accordance with the present invention.
Figure 4:
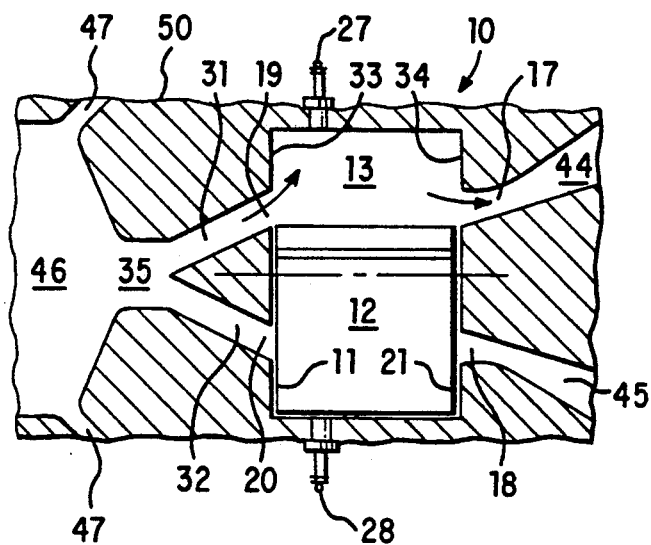
FIG. 4 is a cutaway side view of a two stroke Wankel type rotary engine, all in accordance with the present invention.

Continuing with reference to FIG. 1, it can be seen that exhaust ports 17 and 18 are provided in epitrochoidal housing 50 to allow for the exhaust of spent gases. Intake ports 19 and 20 as shown in FIGS. 3 and 4 are provided for the introduction of a fuel/air charge (intake) on the sidewall 33 of the housing 50 (not shown in FIG. 1). As rotor 12 rotates within housing 50 the flanks 11 and 21 of rotor 12 slide next to exhaust ports 17 and 18 and intake ports 19 and 20 to open and close the ports. Thus, the flanks 11 and 21 of rotor 12 act as valves in combination with intake ports 19 and 20 and exhaust ports 17 and 18.

Still with reference to FIG. 1 it can be seen that the epitrochoid 23 necessarily includes nodes 24 and 25 and lobes 28 and 29. The nodes 24 and 25 are located on the minor axis of the epitrochoid 23 and correspond to both top dead center positions (TDC). The lobes 28 and 29 are located on the major axis of the epitrochoid 23 and correspond to both bottom dead center regions (BDC).

Figure 2:
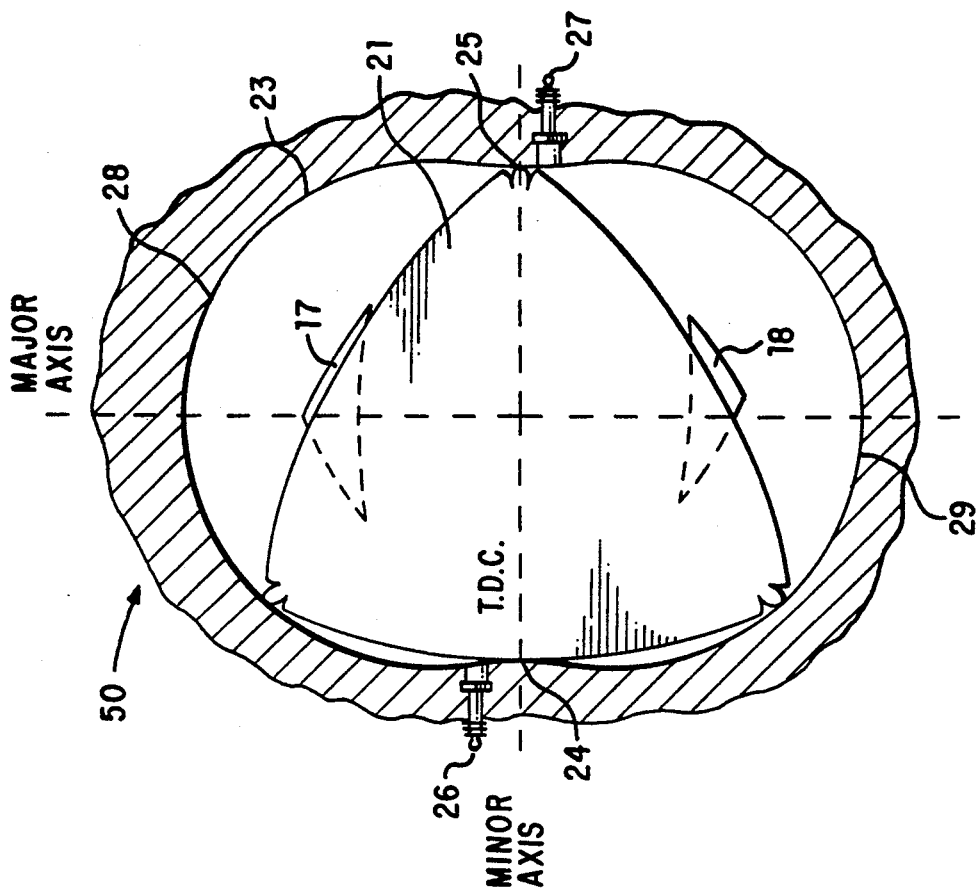
FIG. 2 is an end view of the housing section of a single rotor internal combustion engine with a rotor depicted in place with the left rotor face in a top dead center position in accordance with the present invention.

With reference to FIG. 2 it can be seen that the rotor 12 has been rotated so that the "chamber volume" at the left side of housing 50 is the smallest volume. At that position, the rotor is at a top dead center position.

Chamber volume is defined as the volume between the rotor face and the epitrochoidal housing. The top dead center (TDC) position corresponds with the top dead center position in conventional piston engines. When the rotor 12 is at a position where the chamber volume is the least (minimum), then the rotor 12 is at a top dead center (TDC) position by definition. When the rotor 12 is at a position where the chamber volume is the greatest (maximum), then the rotor 12 is at a bottom dead center (BDC) region by definition. There are two bottom dead center regions in a two lobe epitrochoidal housing.

While rotor 12 is shown to rotate in a clockwise direction with respect to housing 50 in both FIGS. 1 and 2, it should be understood that the rotor 12 is rotatably attached to an eccentric (not shown) and a crank shaft (not shown) and that the direction of rotation is immaterial to the proper working of the invention. Furthermore, the engine shown in FIGS. 1 and 2 could be either a rotating crankshaft fixed housing engine or a fixed crankshaft rotating housing engine.

With continued reference to FIGS. 1 and 2, it can be seen that by placing spark plugs 26 and 27 near the geometric TDC positions 24 and 25 that two areas of power strokes are available to each rotor face upon each revolution of the rotor 12. With the conventional four stroke cycle Wankel engine only a single area of power stroke is available for each rotor face revolution. Furthermore, the four stroke cycle Wankel engine necessitates having that single area of power stroke on one side of the engine. The opposite side provides intake. The result with the four stroke Wankel engine is thus to provide an engine having a housing with a constant cold side and a constant hot side. The temperature gradient becomes a problem in such engines. The instant invention, on the other hand, provides two power strokes for each rotor face revolution producing two combustion sides and therefore more even heat distribution about the housing 50.

Figure 5:
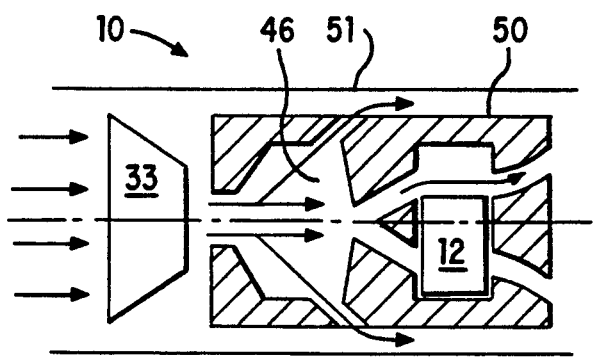
FIG. 5 is a diagrammatic view of the engine of the present invention depicting the intake plenum and associated compressor including the division of the compressed air for intake to the engine as well as for cooling.

With reference to FIG. 3, it can be seen that the ports 17 and 18 are exhaust ports which are apertures in the sidewall 34 of housing 50. The corresponding sidewall 33 of housing 50 is provided with intake ports 19 and 20 as shown in FIG. 4. Both of the sets of ports lie in an envelope on the sidewalls 33 and 34, which are exposed only when the rotor 12 is near the bottom dead center region. The intake ports 19 and 20 are fed via passages 31 and 32 from an intake manifold 35 which is in pneumatic communication with the intake plenum 46 and is in turn provided with compressed air from an engine driven air compressor 33 as shown in FIG. 5. Exhaust ports 17 and 18 lead directly to the atmosphere.

With reference to FIG. 4 where a stationary crank type engine is depicted, it can be seen that housing body 50 rotates while the crankshaft is fixed. This configuration further provides a rotating plenum 46 in which compressed air or air/fuel mixture is induced. Such a configuration provides a centrifugal force thus providing a stratified charge as depicted in FIG. 4. The air/fuel mixture in rotating plenum 46 is directed into intake manifold 35 which is near the center of rotation of the engine 10 and via passages 31 and 32 into intake ports 19 and 20 located away from the center of rotation. By the rotation of housing 50 the air/fuel mixture is stratified. In the configuration as shown in FIG. 4, the fuel is mixed or injected into manifold 35 and plenum 46 only provides a source of compressed air. If there exists excess air pressure within plenum 46, it will exit passage 47 to be used as bypass air for cooling.

As exhaust gases exit chamber 13, they are centrifugally flung through ports 17 and 18 and into exhaust manifolds 44 and 45 which provide a discharge further away from the center of rotation. In this manner, rotating intake and exhaust passages act as a pump to force intake (air/fuel) mixture into the combustion chamber and to scavenge the exhaust gases.

With reference to FIG. 5, a diagrammatic view of the engine is depicted. As can be seen in FIG. 5, engine 10 is operably connected to a source of compressed air 33. The compressed air is ducted into plenum 46 which divides the air into intake manifold 35 and excess air cooling passages 47. Compressor 33 can be a centrifugal or axial or other type of compressor and can be driven in any manner. Cooling shroud 51 is provided to direct cooling air from passages 47 around the engine 10.

While a spark ignition engine type engine was described above, it should be noted that either spark ignition or compression ignition could be used successfully with this engine without departing from this teaching or from the scope of this invention.

Although specific applications, materials, components, connections, sequences of events, and methods have been stated in the above description of the preferred embodiment of the invention, other suitable materials, other applications, components and process steps as listed herein may be used with satisfactory results and varying degrees of quality. In addition, it will be understood that various other changes in details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention as hereinafter claimed.

I claim:

1. An improvement in a rotary internal combustion engine of the two-stroke Wankel type having an intake means and an exhaust means and a multifaced rotor within a two lobe epitrochoidal housing, one of the rotor and housing being connected to rotate with respect to the other, and the housing having a first side wall and a second side wall and having at least two top dead center positions and at least two bottom dead center regions and wherein a power stroke originates upon the rotation of each face of the rotor past one of the top dead center positions; the improvement comprising;

intake port means within said first side wall proximate to the rotor when it is in the bottom dead center region in said housing and transecting the major axis of the housing; and exhaust port means within said second side wall in a region proximate the rotor when it is in bottom dead center positions in said housing.

2. The engine as described in claim 1 wherein the intake port means in said first side wall is spaced angularly from the exhaust port means in said second side wall.

3. The engine as described in claim 2 further comprising a crankshaft means eccentrically attached to said rotor wherein said crankshaft means remains stationary and said epitrochoidal housing rotates about said crankshaft means.

4. The engine as described in claim 1 further comprising a cooling flow means for providing a mass flow of air from said intake plenum means about the engine.

5. The engine as described in claim 1 further comprising an intake manifold means having an inlet end and a port end and wherein said inlet end originates proximal to the center of revolution of said engine housing and wherein said port end terminates at said intake port means.

6. The engine described in claim 1 further comprising an exhaust manifold means having an port end and an exit end and wherein said port end originates at the exhaust port means and wherein said exit end terminates at a distance from the center of revolution of said engine housing greater than that of said exhaust port means.

7. The engine described in claim 1 further comprising an exhaust manifold means having an port end and an exist end and wherein said port end originates at the exhaust port means and wherein said exit end terminates at a distance from the center of revolution of said engine housing greater than that of said exhaust port means.

8. An improvement in a rotary internal combustion engine of the two stroke Wankel type having an intake means and an exhaust means and a rotating multi-faced rotor revolving within and with respect to a two lobe epitrochoidal housing having a first side wall and a second side wall, having at least two top dead center positions and at least two bottom dead center regions and wherein a power stroke originates upon the rotation of each face of the rotor past one of the top dead center positions, the improvement comprising:

a compressor means for providing a source of compressed air to said intake means;

an intake plenum means pneumatically connected between said compressor means and said intake means and transecting the major axis of the housing;

intake port means within said first side wall in a position adjacent the rotor when it is in the bottom dead center regions in said housing and transecting the major axis of the housing; and exhaust port means within said second side wall in the bottom dead center regions in said housing being positioned substantially opposite to the intake port means.

9. The engine as described in claim 8 wherein the intake port means in said first side wall is spaced angularly from the exhaust port means in said second side wall.

10. The engine as described in claim 9 further comprising a crankshaft means eccentrically attached to said rotor wherein said crankshaft means remains stationary and said epitrochoidal housing rotates about said crankshaft means.

11. The engine as described in claim 8 further comprising an intake manifold means having an inlet end and a port end and wherein said inlet end originates proximal to the center of revolution of said engine housing and wherein said port end terminates at said intake port means.

12. An improvement in a rotary internal combustion engine of the two stroke Wankel type having an intake means and an exhaust means and a rotating multi-faced rotor revolving within and with respect to a two lobe epitrochoidal housing having a first side wall and a second side wall and having at least two top dead center positions and at least two bottom dead center regions and wherein a power stroke originates upon the rotation of each one of the top dead center positions past a face of the rotor; the improvement comprising:

a compressor means for providing a source of compressed air to said intake means, said compressor means operably attached to said intake means;

intake plenum means pneumatically connected between said compressor means and the intake means and transecting the major axis of the housing:

intake port means within said first side wall in a position adjacent to the rotor when it's in the bottom dead center regions in said housing and transecting the major axis of the housing; and exhaust port means within said second side wall in the bottom dead center regions in said housing being positioned substantially opposite to the intake port means wherein the intake port means in the first side wall is spaced angularly from the exhaust port means in the second side wall.

* * * * *